(12) United States Patent
Lai et al.

(10) Patent No.: US 7,246,257 B2
(45) Date of Patent: Jul. 17, 2007

(54) COMPUTER SYSTEM AND MEMORY CONTROL METHOD THEREOF

(75) Inventors: Chun-Yi Lai, Taipei Hsien (TW); Fu-Yuan Tai, Taipei Hsien (TW); Pao-Chi Sun, Taipei Hsien (TW); Kuo-Jung Peng, Taipei Hsien (TW); Fan-Chen Chang, Taipei Hsien (TW); Hong-Chi Lin, Taipei Hsien (TW); Yuan-Hao Chang, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 459 days.

(21) Appl. No.: 10/780,792

(22) Filed: Feb. 18, 2004

(65) Prior Publication Data

US 2004/0205384 A1    Oct. 14, 2004

(30) Foreign Application Priority Data

Mar. 7, 2003    (TW) .............................. 92104995 A (51) Int. Cl.
*G06F 11/00*    (2006.01)
(52) U.S. Cl. ........................................................... 714/6
(58) Field of Classification Search .................... 714/6, 714/5
See application file for complete search history.

(56) References Cited

U.S. PATENT DOCUMENTS

| | | | | |
|---|---|---|---|---|
| 6,038,680 A | * | 3/2000 | Olarig | 714/6 |
| 6,052,798 A | * | 4/2000 | Jeddeloh | 714/8 |
| 6,449,731 B1 | * | 9/2002 | Frey, Jr. | 714/9 |
| 6,467,048 B1 | * | 10/2002 | Olarig et al. | 714/7 |
| 6,615,375 B1 | * | 9/2003 | Mounes-Toussi et al. | 714/54 |
| 6,851,071 B2 | * | 2/2005 | Bossen et al. | 714/5 |
| 7,043,665 B2 | * | 5/2006 | Kern et al. | 714/5 |
| 7,043,666 B2 | * | 5/2006 | Wynn et al. | 714/8 |
| 2002/0099916 A1 | * | 7/2002 | Ohran et al. | 711/162 |
| 2003/0090941 A1 | * | 5/2003 | Harari et al. | 365/185.29 |
| 2005/0182989 A1 | * | 8/2005 | Zamke et al. | 714/7 |

OTHER PUBLICATIONS

"Computer architecture and organization" Hayes; 1998.

* cited by examiner

*Primary Examiner*—Robert Beauiliel
(74) *Attorney, Agent, or Firm*—Thomas, Kayden, Horstemeyer & Risley (57) ABSTRACT

A computer system unaffected by memory module instability. The computer system writes data to a plurality of memory modules. If non-recoverable errors occur in one memory module or the number of errors in one memory module reaches a preset value, the computer system reads data from another memory module. Also, a method of controlling the memory modules is disclosed.

11 Claims, 7 Drawing Sheets

COMPUTER SYSTEM AND MEMORY CONTROL METHOD THEREOF

BACKGROUND OF THE INVENTION

1. Field of the Invention

The present invention relates to a computer system and more particularly to a computer system unaffected by memory module instability and a method for controlling the memory modules.

2. Description of the Related Art

Figure 1:
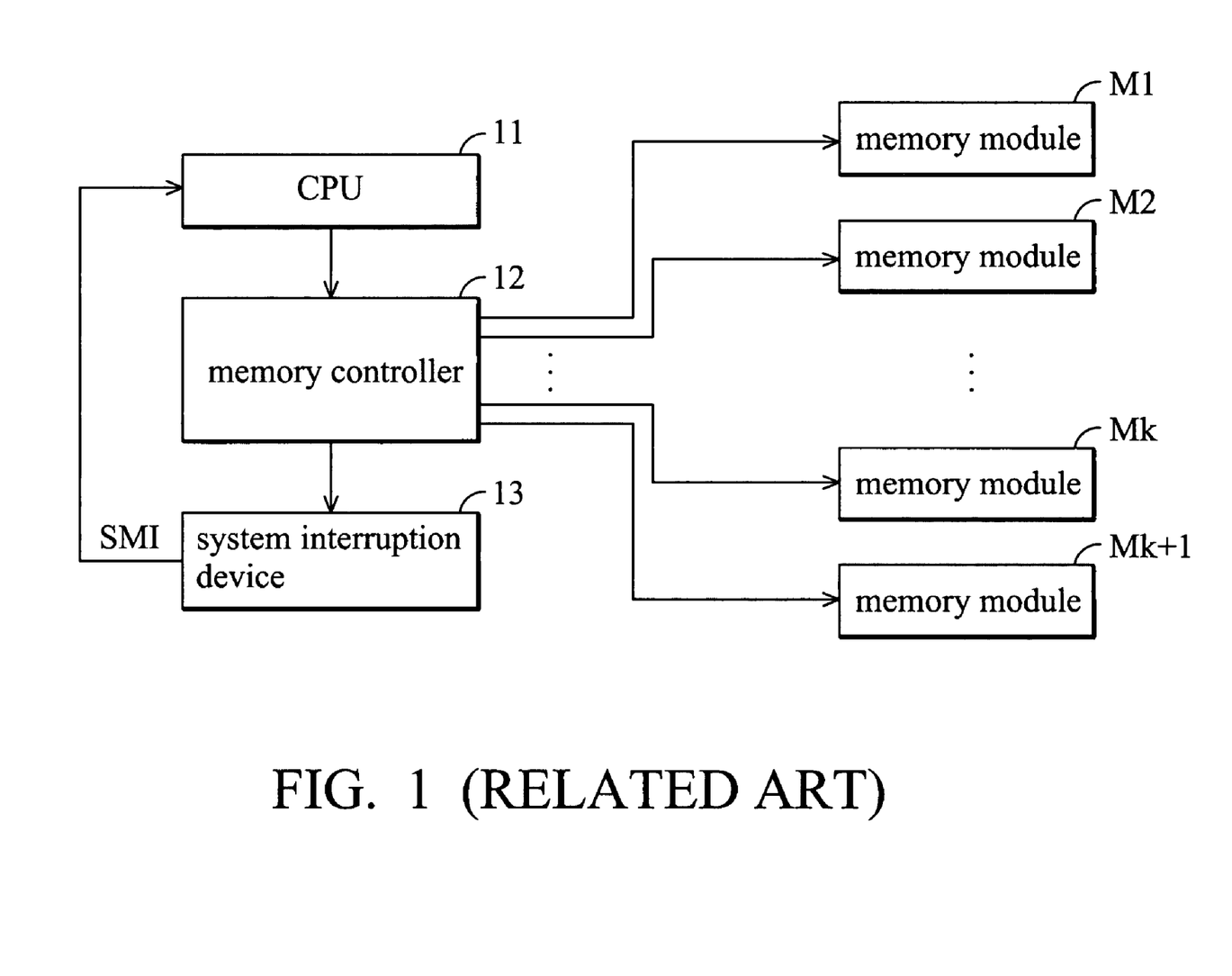
FIG. 1 is a frame diagram of a conventional computer system.

FIG. 1 is a structural diagram of a conventional computer system. As shown in FIG. 1, the conventional control system comprises a central processing unit (CPU) 11, a memory controller 12, a system interruption device 13, and memory modules M1~Mk+1. The memory controller 12 controls the memory modules M1~Mk+1. When an error correction code (ECC) error in a memory module is detected, the memory controller 12 repairs the ECC error and activates the system interruption device 13. The system interruption device 13 then outputs a SMI signal to the CPU 11. The CPU 11 executes a system management mode (SMM) program and records the address of the memory module experiencing the ECC error.

Generally speaking, during operation, a server or workstation executes continuous and long-term computations without interruption or system shutdown. ECC errors indicate instability of memory modules. When an irreparable ECC error occurs in a memory module, resulting computational data is erroneous and the system crashes.

Additionally, conventional memory controllers cannot functionally isolate an unstable memory module from other memory modules, compounding the effects of errors therein.

SUMMARY OF THE INVENTION

Accordingly, an object of the present invention is to provide a computer system with enhanced system stability.

Accordingly, the present invention provides a system and control method of memory modules, writing data thereto while reading data from only selected memory modules.

The computer system comprises at least one memory mirror unit and a memory controller. The memory mirror unit controls a plurality of memory modules and receives error control signals. The memory mirror unit writes data to the memory modules during a write cycle, and activates a first memory module among the memory modules, to read data during a read cycle. The memory controller activates the error control signal when detecting a read error in the first memory module. The memory mirror unit disables the first memory module and activates a second memory module among the memory modules accordingly.

The method comprises the steps of supplying at least one memory mirror unit, controlling a memory module group comprising a plurality of memory modules equalizing addresses of the memory modules within each memory module group, writing data to the corresponding memory modules according to a write address during a write cycle, and enabling a first memory module among the corresponding memory modules according to a read address during a read cycle.

The computer system activates an error control signal received by the corresponding memory mirror unit and selects a second memory module of the corresponding memory modules when a read error occurs in the first memory module.

BRIEF DESCRIPTION OF THE DRAWINGS

The present invention can be more fully understood by reading the subsequent detailed description and examples with reference made to the accompanying drawings, wherein.

DETAILED DESCRIPTION OF THE INVENTION

A computer system of the present invention is unaffected by memory module instability. The computer system comprises at least one memory mirror unit and a memory controller. The memory mirror unit controls memory modules (M1~Mn) and receives error control signals. The memory mirror unit writes data to the memory modules (M1~Mn) during a write cycle and activates one memory module Mi ($1 \leq i \leq n$) to read data during a read cycle. Each memory module has the same memory address.

The memory controller activates the error control signal upon detecting a read error in the memory module Mi, wherein the memory mirror unit disables the memory module Mi and activates an alternate memory module Mj ($1 \leq j \leq n$; j i) when the read error is detected in the memory module Mi.

The computer system of the present invention comprises at least one memory mirror unit, with the following description disclosing a system comprising a plurality of memory mirror units, each controlling two memory modules, for clarity.

Figure 2:
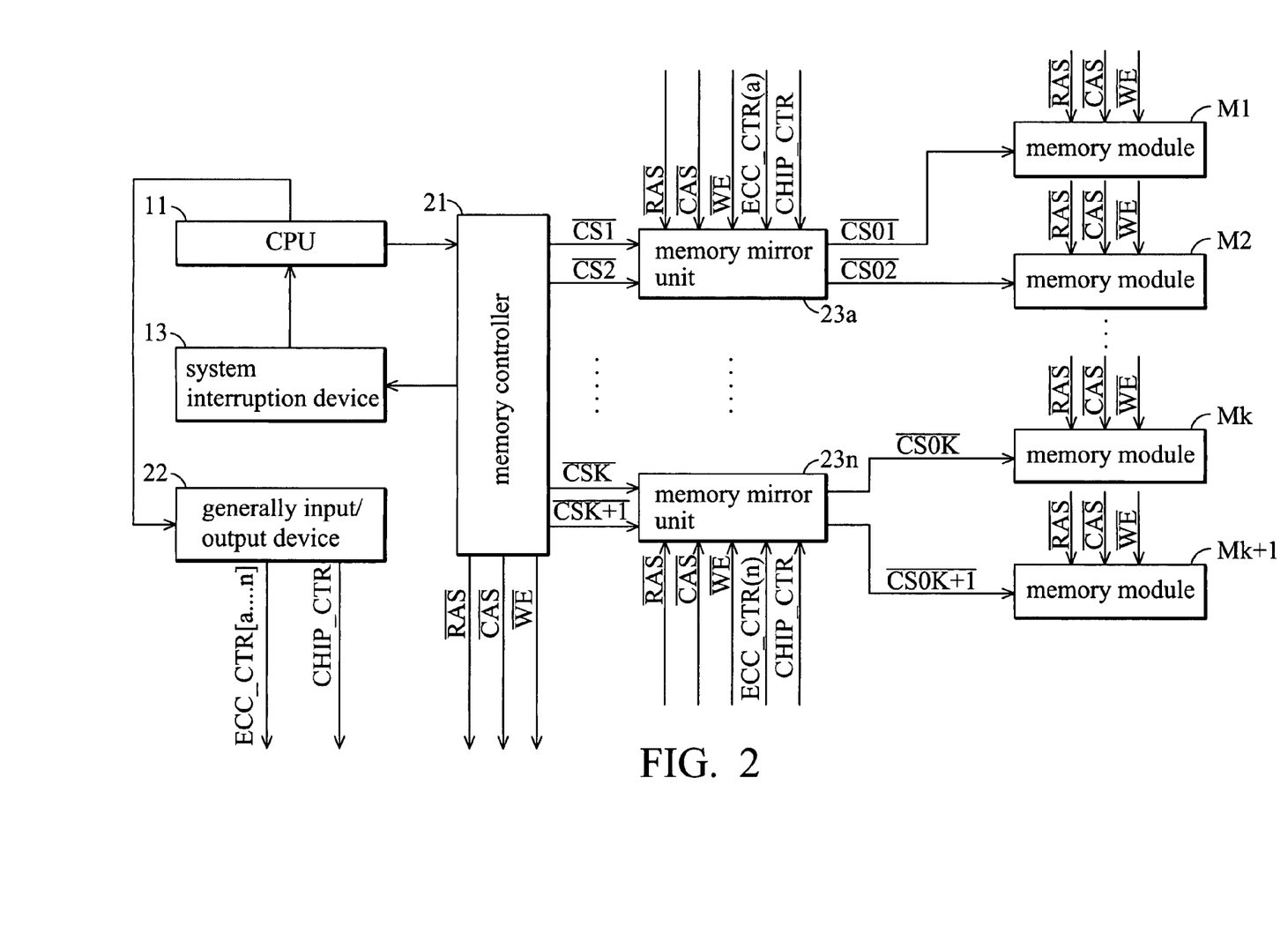
FIG. 2 is a frame diagram of a computer system according to a first embodiment of the present invention.

FIG. 2 is a block diagram of the computer system according to a first embodiment of the present invention. The computer system comprises a CPU 11, a system interruption device 13, a memory controller 21, a general input/output device 22, memory mirror units 23a~23n, and memory modules M1~Mk+1.

Each of the memory mirror units 23a~23n controls first and second memory modules, for example, the memory mirror unit 23a may control memory modules M1 and M2, and memory mirror unit 23n memory modules Mk and Mk+1. Each memory mirror unit 23a~23n writes data to the corresponding memory modules during a write cycle and activates one corresponding memory module to read data during a read cycle.

When a read error is detected by the memory controller 21 in one of the memory modules, the corresponding memory mirror unit disables erroneous the memory module and activates an alternate memory module.

Since the operations of the memory mirror units 23a~23n are the same, only one memory mirror unit 23a is described herein as an example. The memory mirror unit 23a receives a row select signal $\overline{RAS}$, a column select signal $\overline{CAS}$, a write enable signal $\overline{WE}$, an error control signal ECC_CTR(a) and a chip control signal CHIP_CTR, the memory controller 21 providing the row select signal $\overline{RAS}$, column select signal $\overline{CAS}$, and write enable signal $\overline{WE}$. The general input/output device 22 provides the error control signal ECC_CTR(a) and chip control signal CHIP_CTR for control of the memory modules M1 and M2.

When the computer system is turned on, the chip control signal CHIP_CTR activates a memory mirror procedure for equalizing addresses of the memory modules M1 and M2. The memory controller 21 accesses data from the memory module M1 as the memory controller 21 disables the error control signal ECC_CTR(a). When a read error occurs in the memory module M1 when the memory controller 21 activates the error control signal ECC_CTR(a), the memory controller 21 accesses data from the memory module M2.

Figure 3:
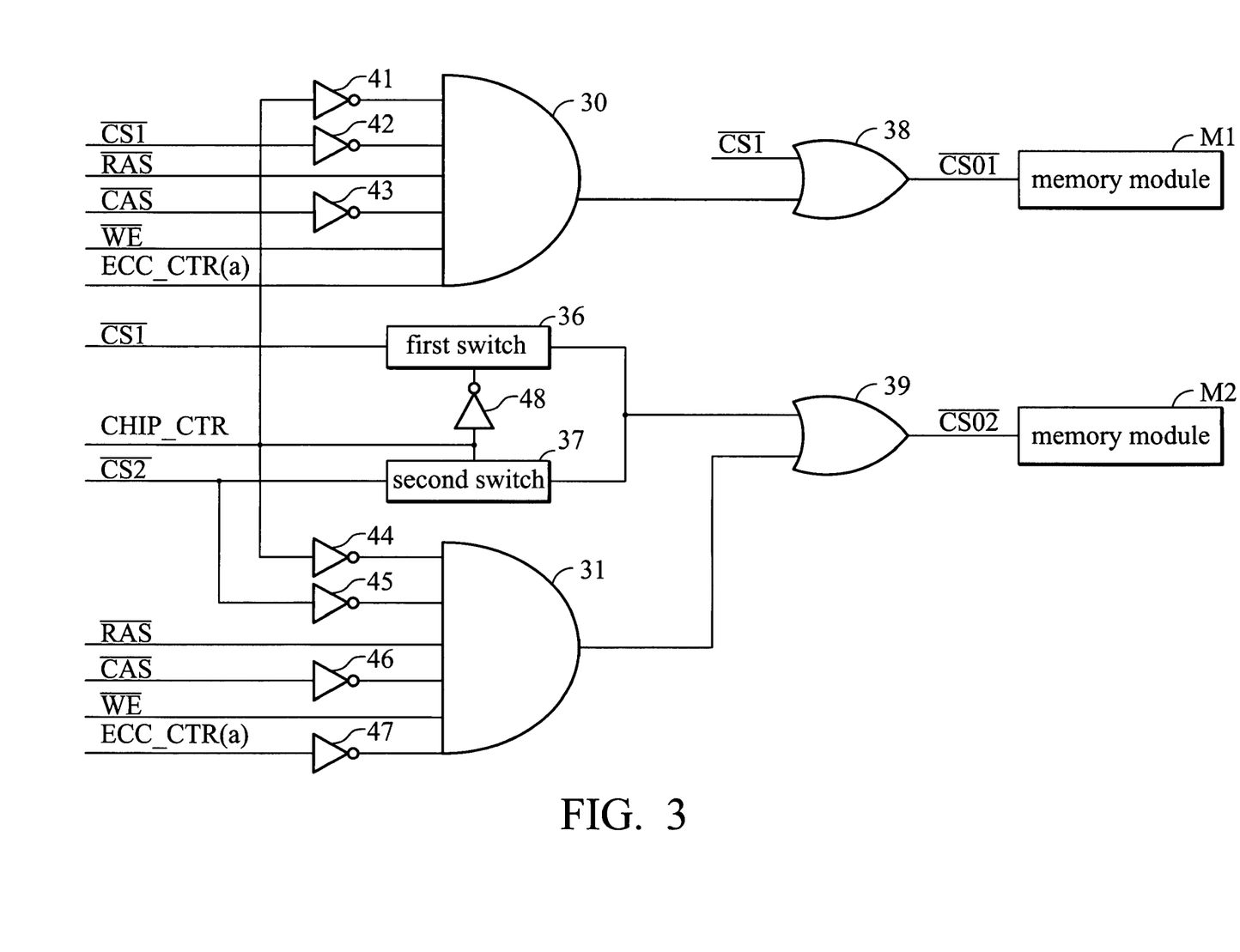
FIG. 3 shows the circuit of the memory mirror unit of the present invention.

FIG. 3 shows the schematic of the memory mirror unit of the present invention. The memory mirror unit comprises a first AND gate 30, first to eighth inverters 41~48, a second AND gate 31, a first switch 36, a second switch 37, a first OR gate 38, and a second OR gate 39.

The first AND gate 30 has a first input terminal, a second input terminal, a third input terminal receiving the row selecting signal $\overline{RAS}$, a fourth input terminal, a fifth input terminal receiving the write enable signal $\overline{WE}$, and a sixth input terminal receiving the error control signal ECC_CTR (a).

The first inverter 41 comprises an input terminal receiving the chip control signal CHIP_CTR, and an output terminal coupled to the first input terminal of the first AND gate 30. The second inverter 42 comprises an input terminal receiving a first enable signal $\overline{CS1}$, and an output terminal coupled to the second input terminal of the first AND gate 30. The third inverter 43 comprises an input terminal receiving the column selecting signal $\overline{CAS}$ and having an output terminal coupled to the fourth input terminal of the first AND gate 30.

The second AND gate 31 comprises a first input terminal, a second input terminal, a third input terminal receiving the row selecting signal $\overline{RAS}$, a fourth input terminal, a fifth input terminal receiving the write enable signal $\overline{WE}$, and a sixth input terminal.

The fourth inverter 44 comprises an input terminal receiving the chip control signal CHIP_CTR, and an output terminal coupled to the first input terminal of the second AND gate 31. The fifth inverter 45 comprises an input terminal receiving a second enable signal $\overline{CS2}$ and an output terminal coupled to the second input terminal of the second AND gate 31. The sixth inverter 46 comprises an input terminal receiving the column selecting signal $\overline{CAS}$, and an output terminal coupled to the fourth input terminal of the second AND gate 31. The seventh inverter 47 comprises an input terminal receiving the error control signal ECC_CTR (a) and an output terminal coupled to the sixth input terminal of the second AND gate 31.

The first switch 36 comprises an output terminal, a control terminal, and an input terminal receiving the first enable signal $\overline{CS1}$. The second switch 37 has an input terminal receiving the second enable signal $\overline{CS2}$, an output terminal coupled to the output terminal of the first switch 36, and a control terminal received the chip enable signal CHIP_CTR.

The eighth inverter 48 comprises an input terminal receiving the chip enable signal CHIP_CTR, and an output terminal coupled to the control terminal of the first switch 36.

The first OR gate 38 comprises a first input terminal receiving the first enable signal $\overline{CS1}$, a second input terminal coupled to the output terminal of the first AND gate 30, and an output terminal coupled to the first memory module M1.

The second OR gate 39 comprises a first input terminal coupled to the output terminal of the first switch 36, a second input terminal coupled to the output terminal of the second AND gate 31, and an output terminal coupled to the second memory module M2.

When the computer system is turned on and activates the chip enable signal CHIP_CTR, the first OR gate 38 outputs an enable signal $\overline{CS01}$ to the memory module M1 and the second OR gate 39 a enable signal $\overline{CS02}$ to the memory module M2. Next, the computer system disables the chip enable signal CHIP_CTR such that memory modules M1 and M2 have the same addresses, and the first enable signal $\overline{CS1}$ controls the enable signals $\overline{CS01}$ and $\overline{CS02}$.

For example, if the read error does not occur in any memory module, memory controller 21 provides the row select signal $\overline{RAS}$, column select signal $\overline{CAS}$, and write enable signal $\overline{WE}$ such that the enable signal $\overline{CS02}$ output from the second OR gate 39 equals the enable signal $\overline{CS01}$ showing that the memory modules M1, M2 have the same data and only the memory module M1 is read. When a read error occurs in the memory module M1, the memory controller 21 activates the error control signal ECC_CTR(a). The first OR gate 38 disables the memory module M1 and the second OR gate 39 activates the memory module M2, indicating that the memory module M2 has been read.

Additionally, there can be two reasons for ECC error messages to be generated. Either an irreparable ECC error occurs in the memory module M1, or the number of errors occurring in the memory module M1 reaches a predetermined value. In either case the memory controller 21 activates the error control signal ECC_CTR(a).

Figure 4:
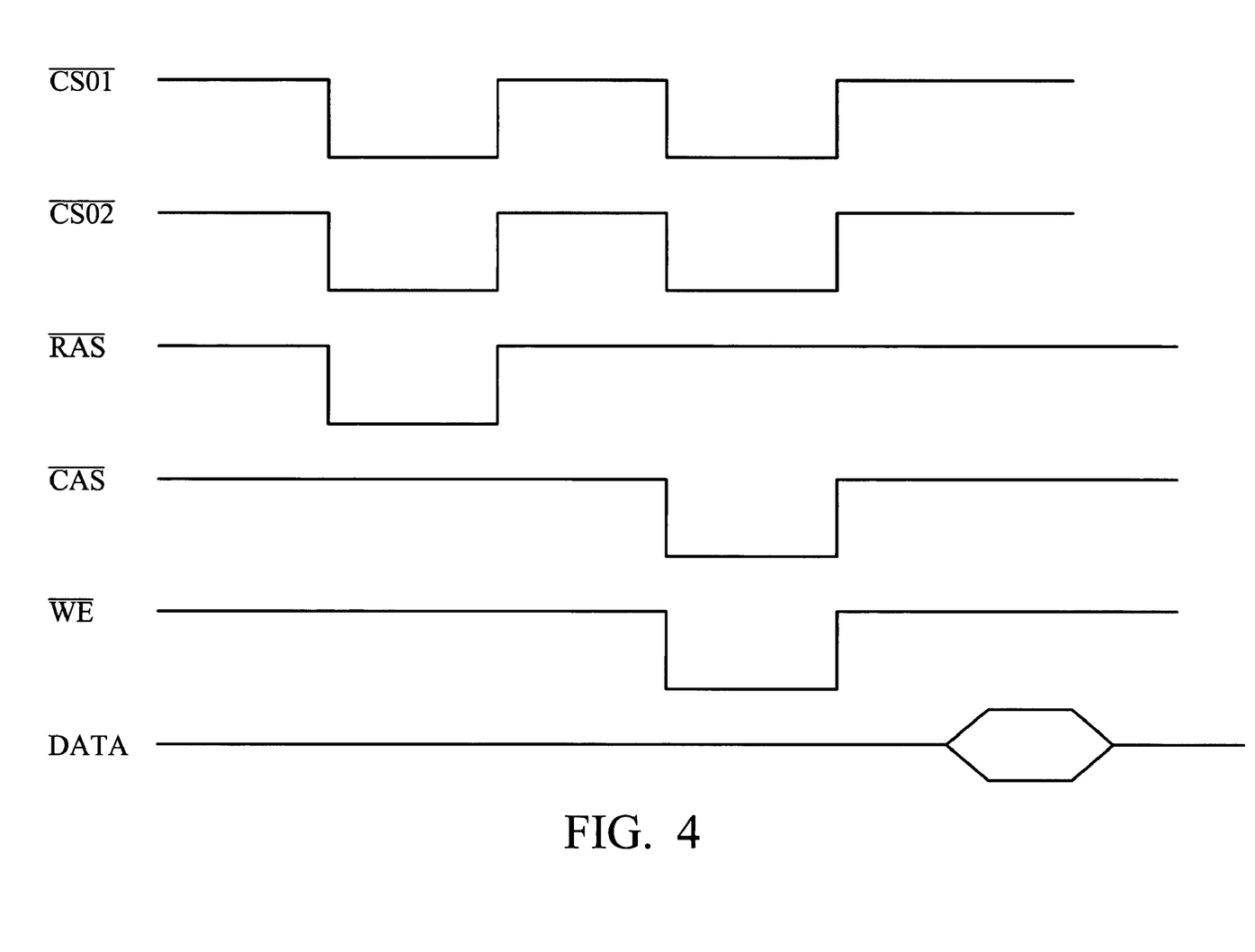
FIG. 4 is a timing chart of the write cycle of the present invention.

FIG. 4 is a timing chart of the write cycle of the present invention. During the write cycle, the memory mirror unit 23a provides the enable signal $\overline{CS01}$ to the first memory module M1 and provides the enable signal $\overline{CS02}$ to the second memory module M2, writing data to the two memory modules.

Figure 5:
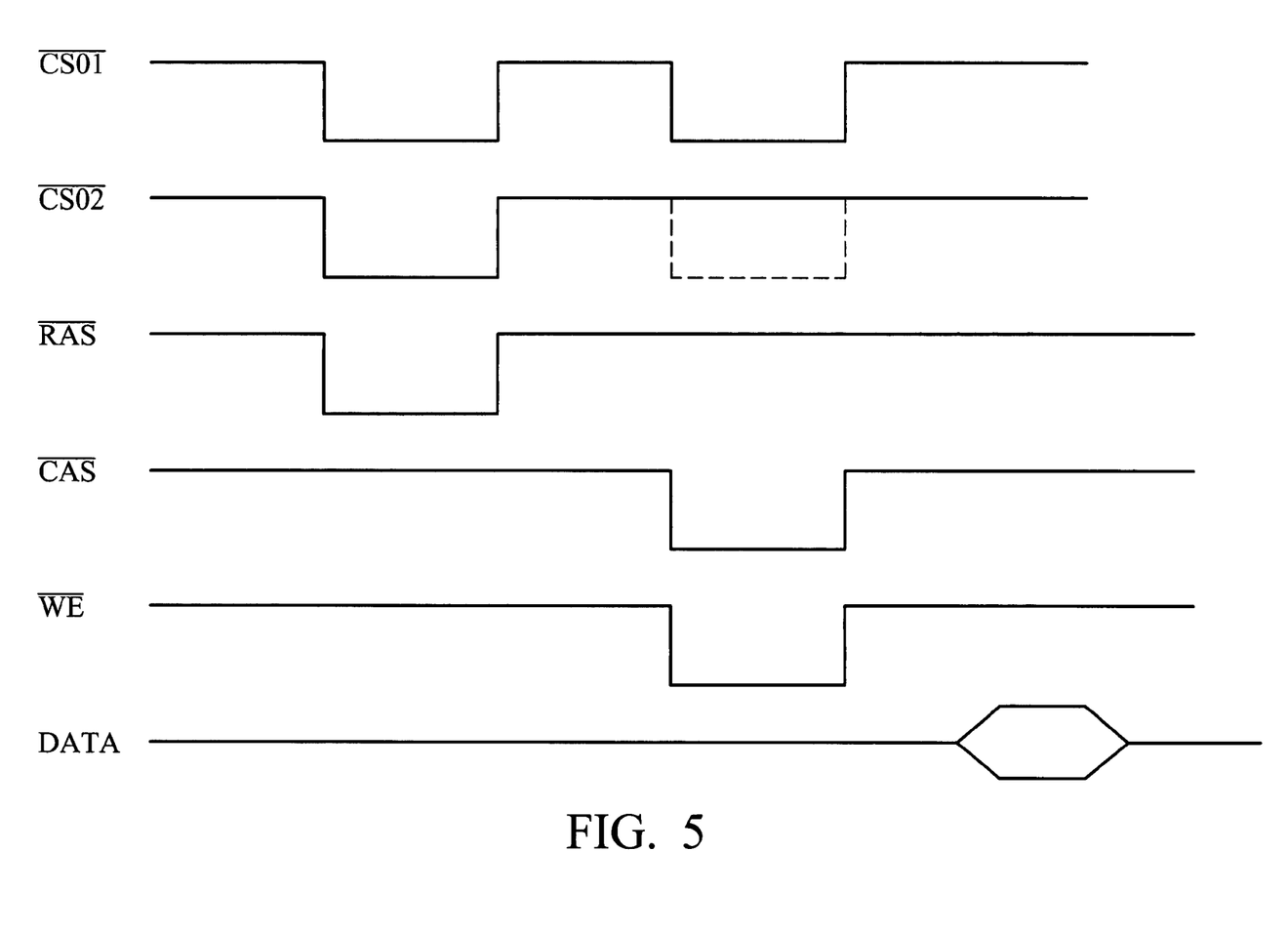
FIG. 5 is a timing chart of the read cycle of the present invention.

FIG. 5 is a timing chart of the read cycle of the present invention. During the read cycle, the computer system reads only data from the first memory module M1 because the enable signal $\overline{CS02}$ is disabled showing a dotted line.

Figure 6:
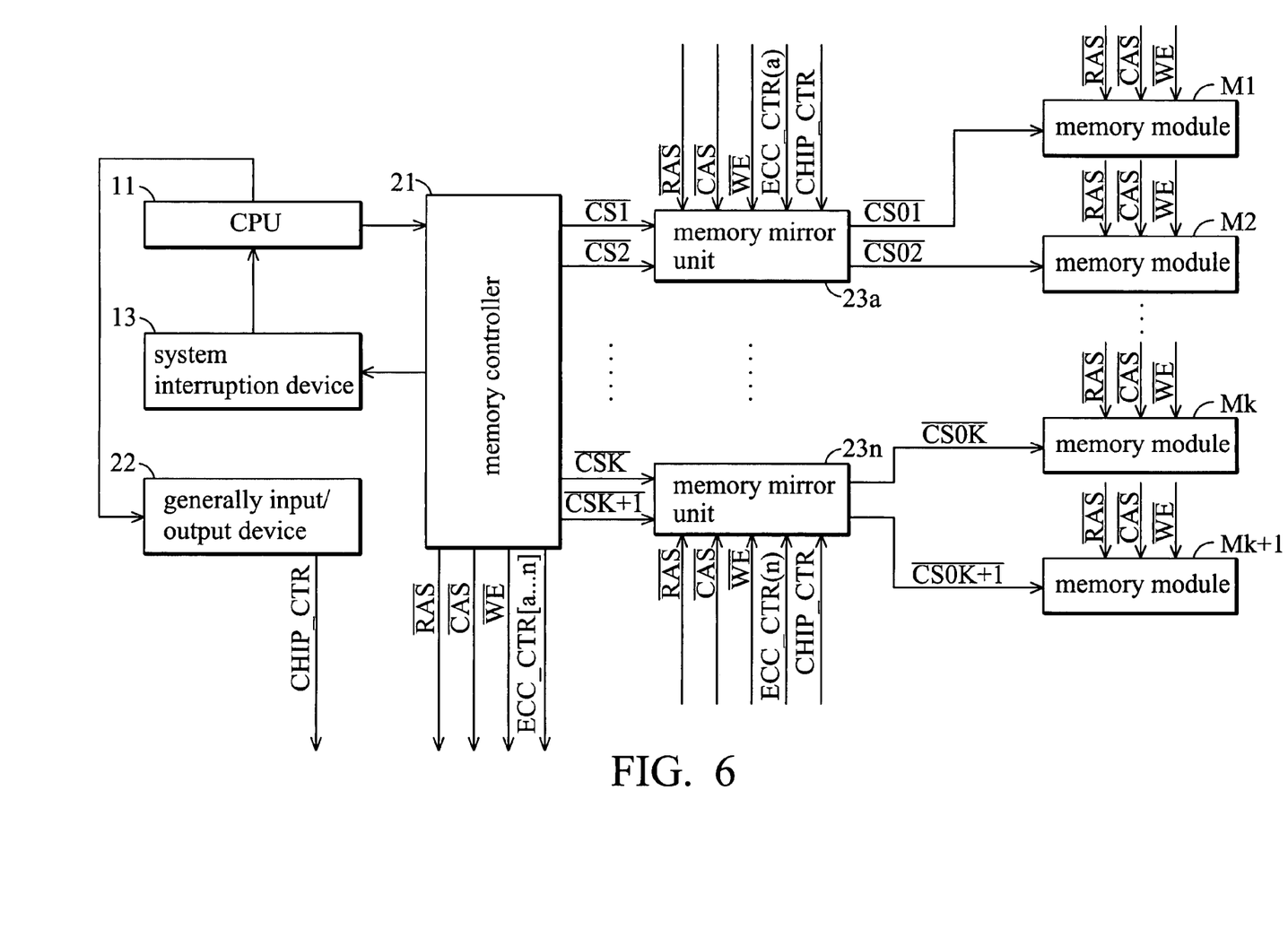
FIG. 6 is a frame diagram of the computer system according to a second embodiment of the present invention.

FIG. 6 is a block diagram of the computer system according to a second embodiment of the present invention. In this embodiment, the error control signals ECC_CTR[a . . . n] are output from the memory controller 21. When an ECC error occurs in the memory module M1, the memory controller 21 clears data read from the memory module M1 and activates the error control signal ECC_CTR(a) to change memory modules, such that programs art not interrupted.

Figure 7:
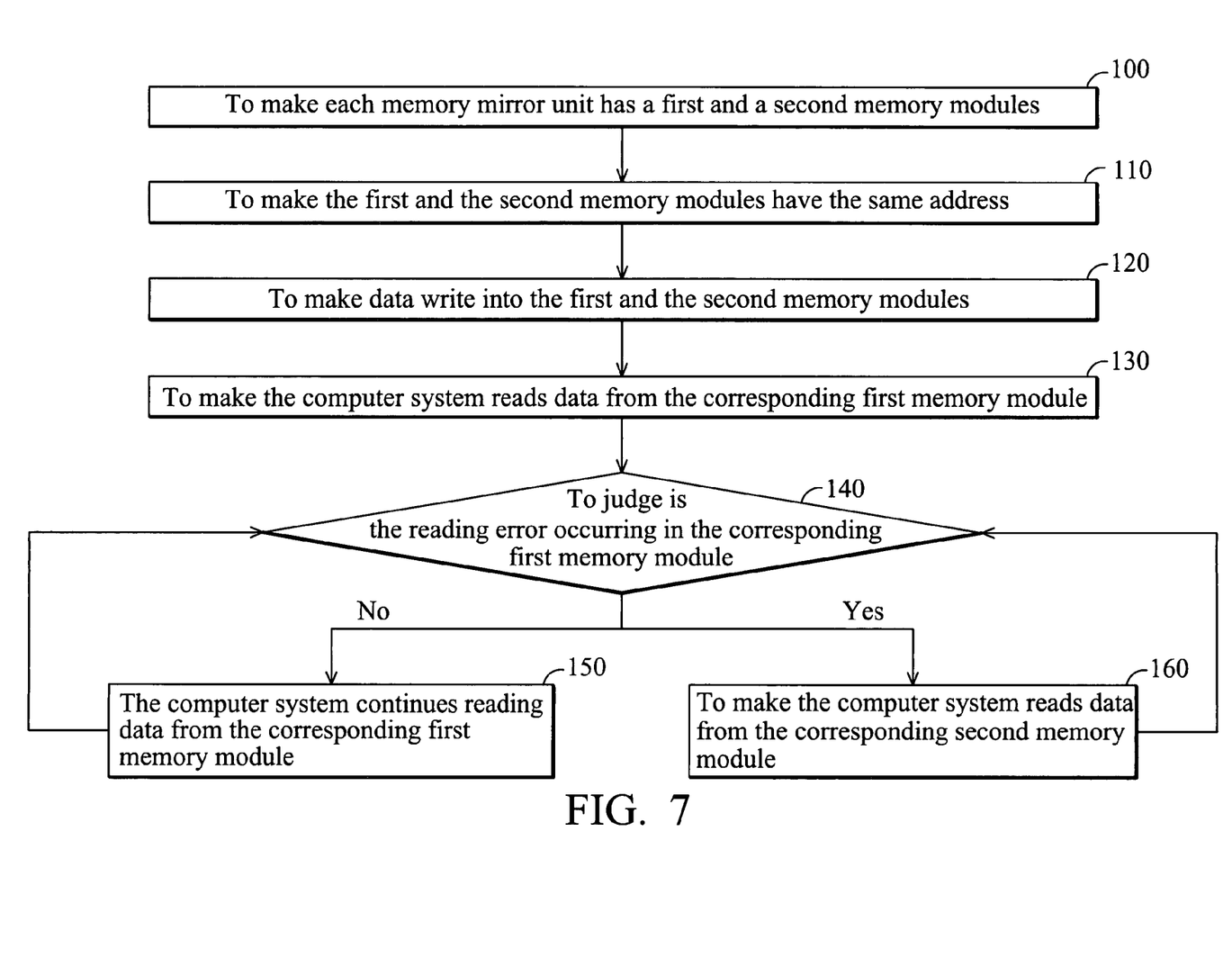
FIG. 7 is a flowchart of the method of memory control according to the present invention.

FIG. 7 is a flowchart of a memory control method applied to a computer system. Memory module pairs are provided during step 100. Each memory module pair comprises a first memory module and second memory module. The computer system equalizes addresses of the first and second memory modules during step 110. Simultaneously, data is written to the first and second memory modules according to a write address during step 120. Data is read from the first memory module during a memory read cycle during step 130. If the ECC error occurs in the first memory module, data is read from the second memory module during a memory read cycle during step 160 and the process reduces to step 140. If no ECC error occurs in the first memory module during step 140, the process proceeds to step 150. Data is read from the first memory module during the memory read cycle during step 150 and the process reduces to step 140.

The present invention utilizes control signals to isolate unstable memory modules. When ECC error occurs in one memory module, the computer system immediately isolates the unstable memory module. Thus, the operating time of the computer system is extended.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, unaffected by memory module instability, comprising:
    at least one memory mirror unit controlling a plurality of memory modules and receiving a corresponding error control signal for control of corresponding memory modules, wherein each of the memory mirror units writes data to the corresponding memory modules during a write cycle and activates a first memory module among the memory modules, reading data during a read cycle;
    a memory controller enabling the error control signal upon detection of a read error in the first memory module, wherein the memory mirror unit disables the first memory module and activates a second memory module among the memory modules when the read error occurs in the first memory module;
    a central processing unit (CPU); and
    a system interruption device providing an interruption signal to the CPU to interrupt system operations and then activate the corresponding error control signal when the memory controller detects the read error;
    wherein each memory mirror unit comprises:
    a first AND gate comprising a first input terminal, a second input terminal, a third input terminal receiving a row selecting signal, a fourth input terminal, a fifth input terminal receiving a write enable signal, and a sixth input terminal receiving the error control signal;
    a first inverter comprising an input terminal receiving a chip control signal and an output terminal coupled to the first input terminal of the first AND gate;
    a second inverter comprising an input terminal receiving a first enable signal and an output terminal coupled to the second input terminal of the first AND gate;
    a third inverter comprising an input terminal receiving a column selecting signal and having an output terminal coupled to the fourth input terminal of the first AND gate;
    a second AND gate comprising a first input terminal, a second input terminal, a third input terminal receiving the row selecting signal, a fourth input terminal, a fifth input terminal receiving the write enable signal, and a sixth input terminal;
    a fourth inverter comprising an input terminal receiving the chip control signal and an output terminal coupled to the first input terminal of the second AND gate;
    a fifth inverter comprising an input terminal receiving a second enable signal and an output terminal coupled to the second input terminal of the second AND gate;
    a sixth inverter comprising an input terminal receiving the column selecting signal and an output terminal coupled to the fourth input terminal of the second AND gate;
    a seventh inverter comprising an input terminal receiving the error control signal and an output terminal coupled to the sixth input terminal of the second AND gate;
    a first switch comprising an output terminal, a control terminal, and an input terminal receiving the first enable signal;
    a second switch comprising an input terminal receiving the second enable signal, an output terminal coupled to the output terminal of the first switch and a control terminal receiving the chip enable signal;
    an eighth inverter comprising an input terminal receiving the chip enable signal and an output terminal coupled to the control terminal of the first switch;
    a first OR gate comprising a first input terminal receiving the first enable signal, a second input terminal coupled to the output terminal of the first AND gate, and an output terminal coupled to the first memory module; and
    a second OR gate having a first input terminal coupled to the output terminal of the first switch, a second input terminal coupled to the output terminal of the second AND gate, and an output terminal coupled to the second memory module.

2. The computer system as claimed in claim 1, wherein the memory controller determines that the read error has occurred when the memory controller detects an irreparable error in the first memory module of corresponding memory modules during the read cycle.

3. The computer system as claimed in claim 1, wherein the memory controller determines that the read error has occurred when the memory controller detects that the number of errors in the first memory module reaches a predetermined value.

4. The computer system as claimed in claim 1, wherein each memory mirror unit controls only a first and second memory module, each memory mirror unit activating the first and second memory modules during the write cycle and only activating the first memory module during the read cycle, and wherein the memory controller activates the error control signal and the memory mirror unit only activates the second memory module upon detection of the read error in the first memory module during the read cycle.

5. The computer system as claimed in claim 1, wherein the chip control signal equalizes the addresses of the first and second memory modules.

6. The computer system as claimed in claim 5, wherein the memory controller determines that a read error has occurred when the memory controller detects the number of errors in the first memory module during the read cycle reaching a predetermined value.

7. The computer system as claimed in claim 6, wherein the error control signal is output from a general input/output device of the computer system and wherein the first enable signal, the second enable signal, the row selecting signal, and the column selecting signal are output from the memory controller.

8. The computer system as claimed in claim 6, wherein the chip control signal is output from a represent general input/output device of the computer system and wherein the error control signal, the first enable signal, the second enable signal, the row selecting signal, and the column selecting signal are output from the memory controller.

9. The computer system as claimed in claim 1, wherein the memory controller determines that a read error has occurred when the memory controller detects an irreparable error in the first memory module during the read cycle.

10. The computer system as claimed in claim 9, wherein the chip control signal and the error control signals are output from a general input/output device of the computer system and wherein the first enable signal, the second enable signal, the row selecting signal, and the column selecting signal are output from the memory controller.

11. The computer system as claimed in claim 9, wherein the chip control signal is output from a general input/output device of the computer system and wherein the error control signal, the first enable signal, the second enable signal, the row selecting signal, and the column selecting signal are output from the memory controller.

* * * * *